United States Patent [19]

Stokes et al.

[11] Patent Number: 4,460,987
[45] Date of Patent: Jul. 17, 1984

[54] VARIABLE FOCUS SONAR WITH CURVED ARRAY

[75] Inventors: Robert H. Stokes, Leander, Tex.; James F. Lynch, Mashpee, Mass.

[73] Assignee: The United States of America as represented by the Secretary of the Navy, Washington, D.C.

[21] Appl. No.: 370,883

[22] Filed: Apr. 22, 1982

[51] Int. Cl.³ .............................................. G01S 7/52
[52] U.S. Cl. ................................... 367/103; 367/123; 367/138
[58] Field of Search ................ 367/103, 121, 123, 138

[56] References Cited

U.S. PATENT DOCUMENTS

| | | | |
|---|---|---|---|
| 2,875,355 | 2/1959 | Petermann | 310/9.5 |
| 3,086,195 | 4/1963 | Halliday | 340/15 |
| 3,090,030 | 4/1963 | Schuck | 340/16 |
| 3,474,402 | 10/1969 | Cook et al. | 340/9 |
| 3,585,579 | 7/1969 | Dorr | 340/9 |
| 3,914,731 | 10/1975 | Warner et al. | 340/6 R |
| 4,152,678 | 5/1979 | Shott et al. | 367/103 |
| 4,187,556 | 2/1980 | Jones | 367/155 |
| 4,241,611 | 12/1980 | Specht | 73/626 |
| 4,271,490 | 6/1981 | Minohara et al. | 367/122 |

OTHER PUBLICATIONS

Stokes & Pruitt, Conference: Eascon '78, Arlington, VA., 9/78, pp. 755-760.

Primary Examiner—Richard A. Farley
Attorney, Agent, or Firm—Robert F. Beers; Harvey A. David

[57] ABSTRACT

Variable focus in a sonar system of the time delay beamformer type using a convexly curved electroacoustic array is achieved by changing the operating frequency.

5 Claims, 6 Drawing Figures

VARIABLE FOCUS SONAR WITH CURVED ARRAY

BACKGROUND OF THE INVENTION

The invention relates generally to the field of sonar systems, and more particularly to sonar systems having an array of transducers for projecting or receiving acoustic energy and having the capability of varying the focal length of the system.

Certain sonar applications, for example object locating and tracking, require a relatively high resolution capability. The desired resolution is generally achieved through the use of multiple transducer elements or staves arranged in a circular array and the signals to or from which are processed to effect what is known as beamforming by which the acoustic wave energy is, in effect focused. The beamforming for focusing process utilizes any of several techniques including predetermined fixed time delays or some form of electronic phase shifting. Other approaches for improving resolution or focus have relied on acoustic lenses or the use of a predetermined array curvature. U.S. Pat. Nos. 3,090,030 and 4,241,611 provide examples of the former, while U.S. Pat. No. 3,585,579 is an example of the latter.

A common shortcoming to the foregoing expedients is the fact that the focal lengths are relatively fixed, a notable disadvantage when there is a need to locate or track objects at a variety of different ranges. U.S. Pat. No. 3,474,402 provides another approach to the need for a variable focal length sonar system, that is, by mechanically altering the curvature of the transducer array. This approach is subject to mechanical failures, is bulky, expensive to build and maintain, and especially difficult to implement in an array having compound curvature, such as a spherical or semispherical array.

U.S. Pat. No. 3,914,731 discloses a sonar system wherein beamforming leading to high resolution is accomplished by using a combination of frequency scaling and velocity scaling through the agencies of heterodyning a local oscillator frequency with received frequencies in combination with acoustic lens means acting between secondary and tertiary concavely curved transducer arrays. As one feature of that disclosure, the local oscillator frequency can be varied to assure focusing of acoustic energy from the secondary array on the tertiary array within the velocity scaling portion of the wavefront processor, or beamformer. This latter feature provides for accommodation of changes in target range as well as changes in acoustic transmission characteristics of the water medium between the sonar and the target or acoustic source. The apparatus disclosed in the patent under discussion, however, requires the use of acoustic lens means using at least another acoustic medium other than the lens medium in the processor, and also requires two additional transducer arrays, all in the signal processing. For fixed operating frequency multistave beamformers using analog electronics, the individual element phase shifts (or equivalent time delays) used to focus at a given distance were necessarily hardwired and one could not change the focal length without the addition or substitution of expensive and highly complicated digital electronic systems. It would be particularly desirable to achieve the advantages of acoustic focusing in a convexly curved, multistave array sonar using fixed time delay analog beamforming without the complexity and expense involved in high speed digital phase shifting beamforming or complex and unwieldy acoustic lens systems.

SUMMARY OF THE INVENTION

With the foregoing in mind, it is a principal object of this invention to provide an improved sonar, or other wavefront emitting and/or receiving system having a curved array, that is characterized by spatial focusing from relatively close to the array to the farfield.

Another object of this invention is the provision of an improved focusing sonar system that is compatible with the utilization of fixed time delay signal processing techniques.

As still another object, the present invention aims, in the preferred embodiment thereof, to take advantage of a fortuitous relationship between changes in operating frequency and focal length of a curved transducer array.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
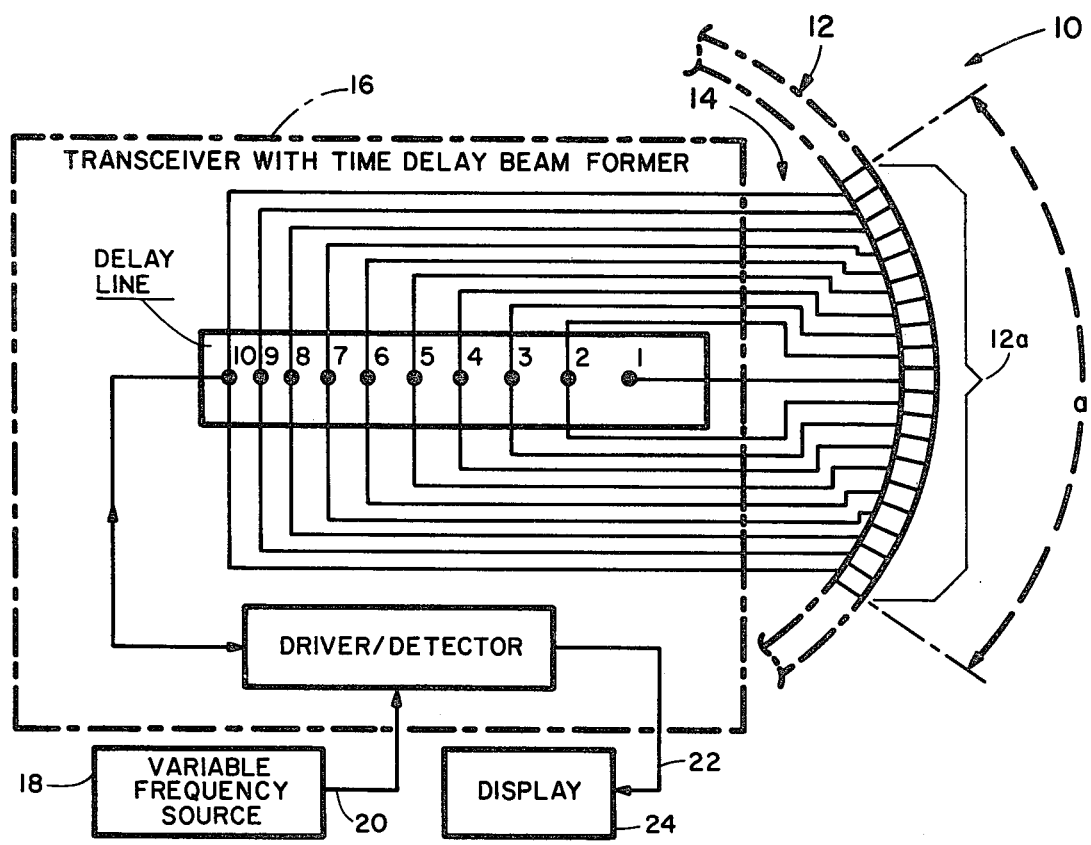
FIG. 1 is a diagrammatic illustration, in block form, of an exemplary variable focus sonar system embodying the present invention.

Referring to the exemplary embodiment of FIG. 1, a sonar system, generally indicated at 10, comprises a circular array 12 made up of a plurality of electroacoustic transducer elements, an arcuate segmental group thereof being shown at 12a. The array can be activated as a whole, or in arcuate portions at which times it serves as a convexly curved array. The transducer elements of the array 12 are electrically connected individually via a cable 14 to a beamforming transceiver 16. The beamforming transceiver 16 can be of any well known construction using time delay means to produce desired phase relationships in acoustic or electrical signals produced by an activated portion of the cylindrical array. The transceiver 16 is provided with a selectively variable frequency signal by a variable frequency source 18, conveniently in the form of a voltage controlled oscillator connected as shown by flow line 20. Of course other selectively variable frequency sources, such as digital synthesizers, for example, can be substituted for the source 18. Suffice it to say that the frequency of acoustic projection or detection, that is the nominal "operating frequency" of the sonar system 10 is selectively and variable controllable by varying the frequency output 20 of the source 18.

The transceiver 16 is connected as shown by flow line 22 to provide an output, representative of received acoustic signals and processed to provide information as to their source, to a display means 24, or other utilization device.

Figure 2:
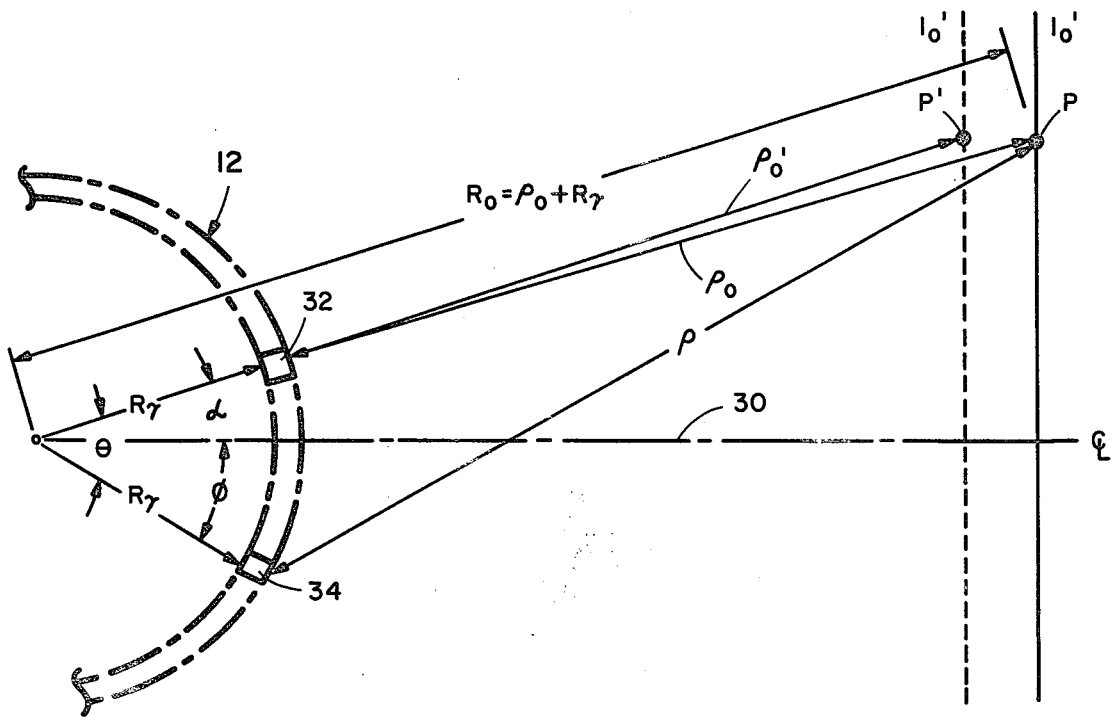
FIG. 2 is diagrammatic illustration of the refocusing geometry of a curved array.

Referring now to FIG. 2, the refocusing geometry of a convexly curved transducer array 12 operating in a receiving mode having a radius $R_\tau$, and focused for frequency f along a centerline 30 substantially at an image plane $I_o$. This figure shows a point P which is displaced from the centerline by an angle $\alpha$ (not a steering angle). The point P is at a range $\rho_o$ from the closest transducer stave or element 32, a range $\rho$ from a stave or element 34 displaced at angle $\phi$ from the centerline, and a range $R_o$ from the center of the array. Angle $\alpha = \theta - \phi$, where $\theta$ is the arcuate displacement of the element 34 from element 32. The range $R_o$ of point P from the center of the array is the sum of $\rho_o$ and $R_T$.

Considering $\rho >> R_T$ it can be shown that the refocused range $\rho_o'$ for a change of frequency from $f_o$ to $f_o'$ can be expressed as $$\rho_o' = \left| \frac{\rho_o f_o}{(\rho_o/R_T)(f_o - f_o') + f_o} \right|,$$

where the absolute magnitude is introduced to preserve the positive definite character of the refocused distance. The derivation and application of the just given relationship may be better understood by reference to the article entitled "Frequency Dependent Refocusing In Phase Shift Beamforming Systems" published in The Journal of the Acoustical Society of America, Vol. 70, No. 3, September 1981, pages 749-755, and the subject matter of which is incorporated herein by reference.

A phase shift beamformer for a cylindrical array was designed and constructed using a time delay line with a total delay equal to one period T at the selected operating frequency $f_o$ of the system (also called a "one wavelength" or "one $\lambda$" delay line). This "one $\lambda$" delay line was divided into ten equal (T/10) taps and the elements of the array, within an aperture a of about 30°, were then connected to the tap that most closely approximated the delay required for beamforming up until the required time delay was greater than T. For elements that required delays greater than T, the correct tap was determined by ignoring integer multiples of T, and selecting the tap most closely approximating the remaining fraction.

Figure 3:
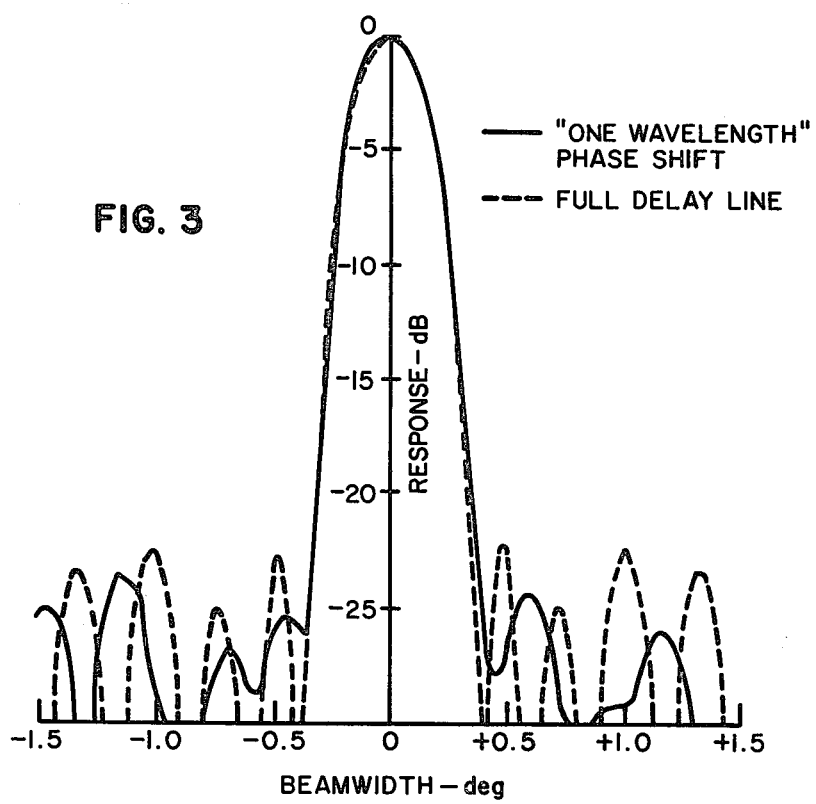
FIGS. 3-6 are graphic illustrations of beam patterns obtained with an experimental sonar embodying the invention.

The physical array had a radius of $185\lambda_o$ and was composed of 236 elements with $0.77\lambda_o$ interelement spacing. Taylor shading for $-26.0$ dB sidelobe suppresion was used. The experimentally measured and theoretically predicted beam patterns for the designed focal distance of $0.68a^2/\lambda_o$ are shown in FIG. 3 and are very similar over the major lobe down to the $-20$ dB region. The measured sidelobes, however, while the same magnitude as the theoretically predicted ones, are different in structure. This is mainly attributed to the severe construction tolerances that had to be maintained in an array as large as the one built to achieve adequate sidelobe suppression, e.g. on the order of 0.001 inches for stave placement.

Figure 4:
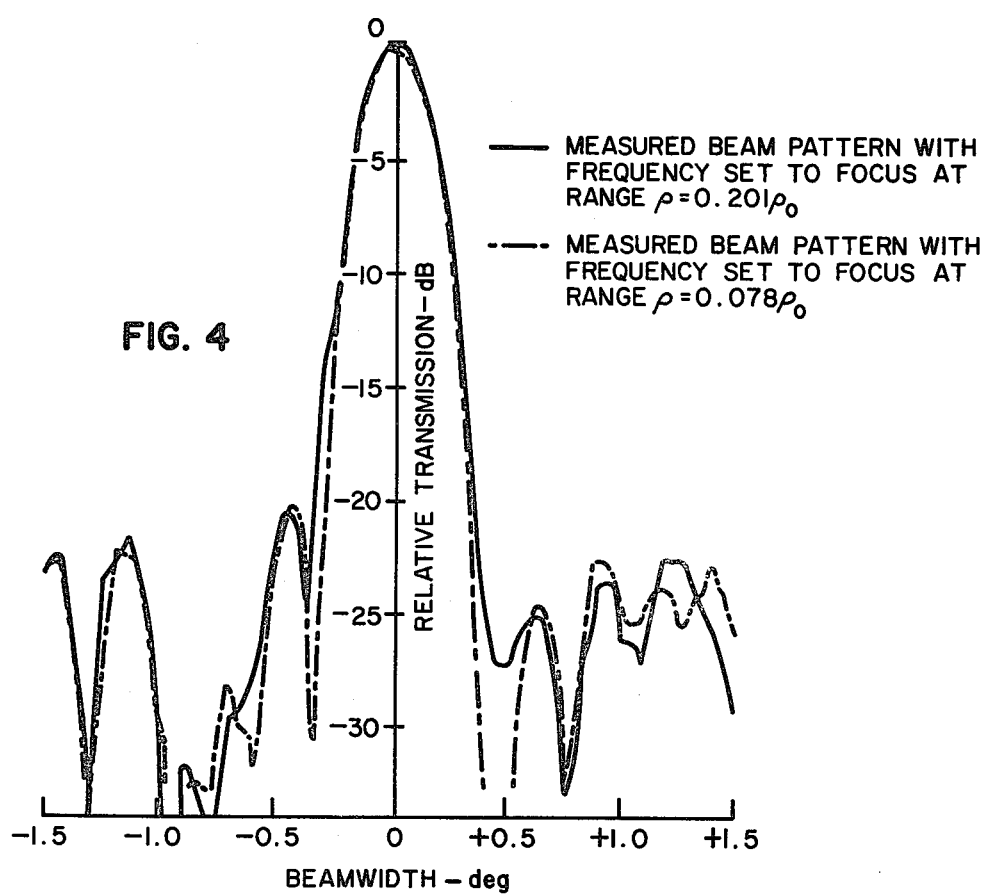

It was discovered that the beamformer, which was designed to focus at a range $\rho_o = 0.68a^2/\lambda_o$, could be focused at a variety of ranges by simply changing the operating frequency slightly and leaving the array elements and beamforming taps connected as originally. "Refocused" beampatterns at ranges of $0.201\rho_o$ and $0.078\rho_o$ were measured experimentally yielding the results shown in FIG. 4. These beampatterns compare well to those in FIG. 3. Of additional interest is the fact that this large amount of change in focal distance was accomplished with a (maximum) operating frequency change of only 6.8%.

Figure 5:
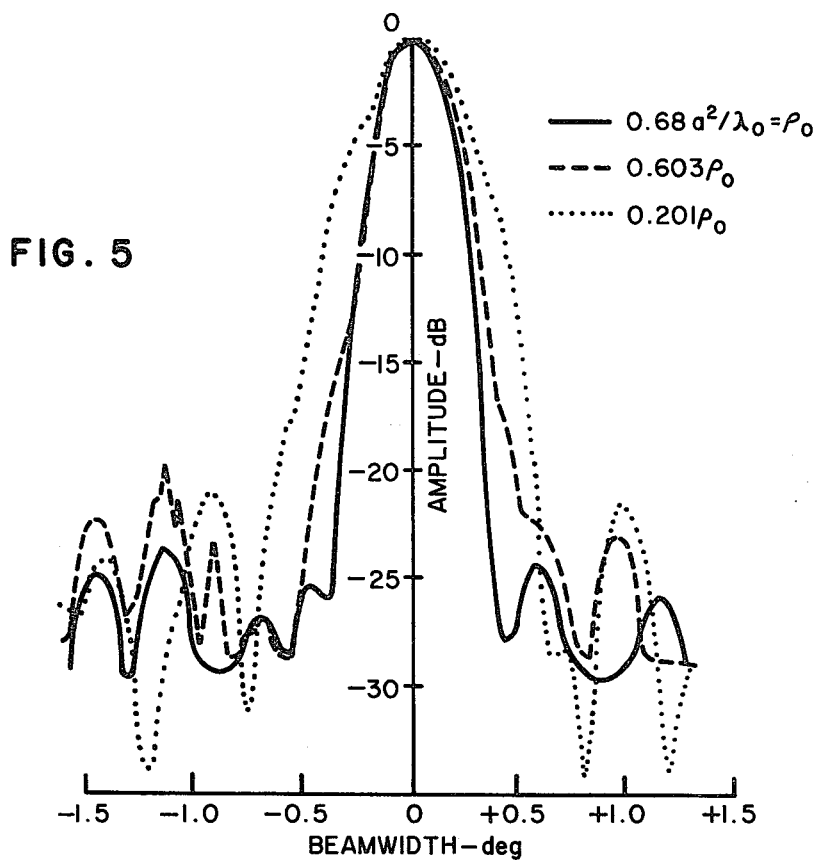
Figure 6:
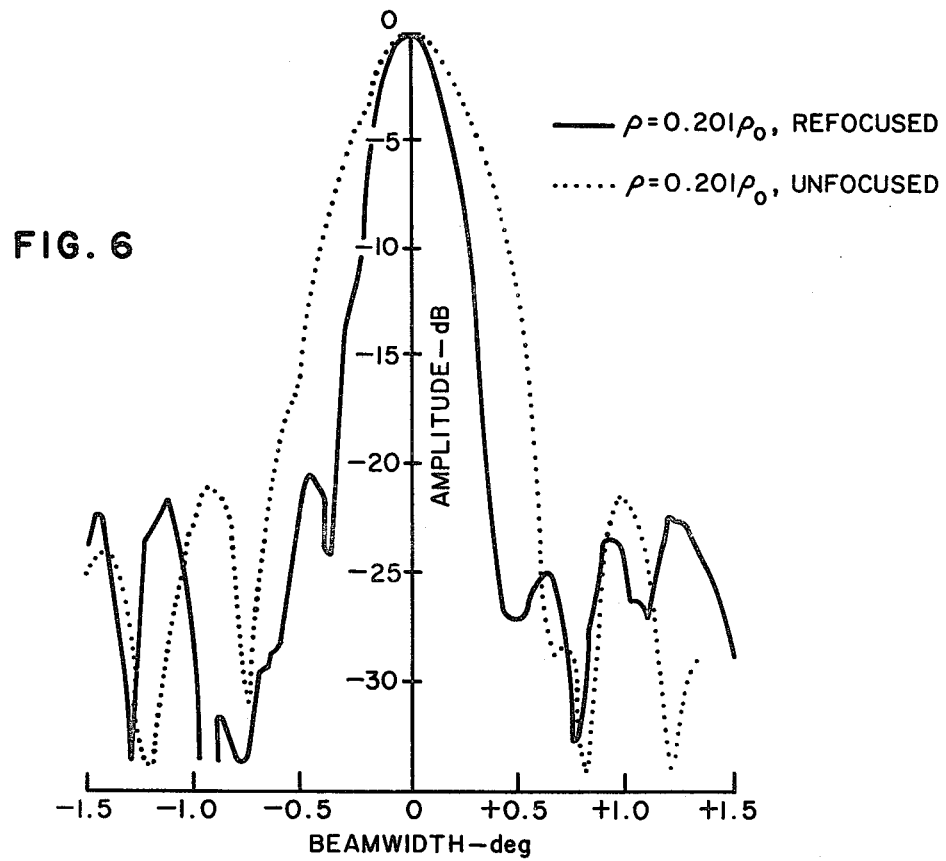

In FIG. 5, are compared the measured beampatterns at the three ranges mentioned above ($\rho_o$, $0.201\rho_o$, and $0.078\rho_o$) all at the same frequency, where the beamformer is (as before) focused at $\rho_o$. The deterioration of the beampattern as it leaves the region of the focal point is quite obvious. For comparison, an out of focus and "refocused" beam at a range of $0.137\rho_o$ are shown in FIG. 6, the improvement being equally obvious.

While the exemplary embodiment shown and described with reference to FIG. 1 is capable of variably focusing both transmission and reception with the curved array 12, it will be understood that the invention is applicable to and contemplates embodiment in both active and passive sonars, and that in active sonars an insonifying transmission can be projected from a separate sound source at the variable, selected operating frequency.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A variable focus sonar system comprising:
    a convexly curved array of electroacoustic transducer elements;
    time delay beamforming means, connected to said array, for effecting predetermined delays in individual electrical signals having a selected operating frequency $f_o$ within a range of operating frequencies and corresponding to predetermined ones of said transducer elements so that said array is characterized by a corresponding focal length;
    selectively variable frequency means, coupled to said time delay beamforming means, and operative to change said selected operating frequency to a different operating frequency $f_o'$ whereby said array is characterized by a corresponding different focal length.

2. A variable focus sonar system as defined in claim 1, and wherein:
    said variable frequency means comprises a variable oscillator means.

3. A variable focus sonar system as defined in claim 2, and wherein:
    said convexly curved array is a circular array, and said predetermined ones of said transducer elements comprise an arcuate segment of said circular array.

4. A variable focus sonar system as defined in claim 3, and wherein:
    said beamforming means forms part of a transceiver, and said array is adapted to both project and receive acoustic signals of said selected and different operating frequencies.

5. A variable focus sonar system as defined in claim 3, and wherein:
    the relationship between the refocused range $\rho_o'$ and the original range $\rho_o$ from the array to a point in a refocused zone of focus due to change from said selected operating frequency $f_o$ to said different operating frequency $f_o'$ can be expressed substantially as $$\rho_o' = \left| \frac{\rho_o f_o}{(\rho_o/R_T)(f_o - f_o') + f_o} \right|,$$

where $R_T$ is the radius of curvature of said array.

* * * * *